United States Patent [19]
Keller

[11] Patent Number: 5,552,505
[45] Date of Patent: Sep. 3, 1996

[54] HIGH TEMPERATURE COPOLYMERS FROM INORGANIC-ORGANIC HYBRID POLYMERS AND MULTI-ETHYNYLBENZENES

[75] Inventor: Teddy M. Keller, Alexandria, Va.

[73] Assignee: The United States of America as represented by the Secretary of the Navy, Washington, D.C.

[21] Appl. No.: 398,848

[22] Filed: Mar. 3, 1995

[51] Int. Cl.$^6$ ............................................... C08G 77/56
[52] U.S. Cl. .................... 528/5; 501/92; 501/97; 525/474
[58] Field of Search ...................... 528/5; 501/92, 501/97; 525/474

[56] References Cited

U.S. PATENT DOCUMENTS

| | | | |
|---|---|---|---|
| 5,272,237 | 12/1993 | Keller et al. | 528/5 |
| 5,292,779 | 3/1994 | Keller et al. | 522/148 |
| 5,348,917 | 9/1994 | Keller et al. | 501/92 |

*Primary Examiner*—Melvyn I. Marquis
*Attorney, Agent, or Firm*—Thomas E. McDonnell; Barry A. Edelberg

[57] ABSTRACT

Copolymers are formed from aromatic acetylenic monomers, or prepolymers formed therefrom, and carborane-(siloxane or silane)-unsaturated hydrocarbon polymers. These copolymers can be used as is to form useful articles, adhesives, matrix materials, and coatings for various marine and aerospace applications, or may be pyrolyzed to form carbon-ceramic composites.

20 Claims, 4 Drawing Sheets

HIGH TEMPERATURE COPOLYMERS FROM INORGANIC-ORGANIC HYBRID POLYMERS AND MULTI-ETHYNYLBENZENES

BACKGROUND OF THE INVENTION

1. Field of the Invention

The present invention relates generally to carbon-carbon composites and more particularly to the protection of carbon composites from oxidation and degradation at high temperatures.

2. Description of the Background Art

Carbon-carbon composites are strong, lightweight, high temperature materials that are used as ablators in short duration rocket and reentry systems and are currently being developed for structural applications in advanced missiles, aircraft, and aerospace vehicles. Carbon-based materials are desirable because of the high strength and low weight density of carbon. Furthermore, carbon maintains its mechanical properties at high temperatures up to 2000° C. Many future applications for C—C composites require operation at elevated temperatures in an oxidizing environment. Carbon erodes rapidly in air at temperatures as low as 400° C. Much effort is thus being devoted at developing techniques for protecting C—C composites against oxidation at elevated temperatures. An effective method of protecting carbon from oxidation is to establish a barrier against oxygen penetration in the form of an external coating. The development of external coatings such as ceramics to protect C—C composites was initiated about 20 years ago to provide reusable thermal protection for the shuttle orbiter vehicles. Because of the large differences in thermal expansion characteristics of carbon fibers and ceramic materials, few coatings have been found to withstand thermal cycling without cracking. The strategy that has proven most successful dealing with cracked external coatings is to employ a boron-rich inner coating beneath the cracked outer coating that acts as the oxygen barrier. In this scheme, oxygen penetrating the crack oxidizes the boron layer to produce a compliant sealant glass ($B_2O_3$) that fills and seals the crack. Prominent coating combinations consist of a SiC outer coating and boron-rich inner coatings that consist of elemental boron or $B_4C$. The silicon-based ceramics are used for outer coatings because of their excellent oxidative stability, refractoriness, and relatively low thermal dimensional changes.

Another approach often used in combination with external barrier coating is to add elemental boron, $B_4C$, SiC, and phosphorous compounds to precursor carbon matrix material during processing. On exposure to air at elevated temperatures, these additives are expected to oxidize and provide in-depth oxidation protection. Experience has shown that it is difficult to achieve a uniform dispersion of the particulate additive throughout the composite and substantial amounts of the carbonaceous material are oxidized before the additive can become effective.

SUMMARY OF THE INVENTION

It is an object of the present invention to form compositions that have high strength and low weight density and are oxidatively stable at high temperatures.

It is a further object of the present invention to protect carbon-carbon composites from oxidative degradation at high temperatures.

It is another object of the present invention to form a carbon-carbon composite having an homogeneous distribution of a protectant against high temperature oxidative degradation.

These and other objects are achieved by copolymers formed from aromatic acetylenic monomers, or prepolymers formed therefrom, and carborane-(siloxane or silane)-unsaturated hydrocarbon polymers.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements, wherein.

DESCRIPTION OF THE PREFERRED EMBODIMENT

Many of the aromatic acetylenic monomers useful in the aromatic acetylenic component of the copolymer of the present invention have been described in United States patent application Ser. No. 08/023,442, filed Feb. 26, 1993, by Keller et al., the entirety of which is incorporated by reference herein, for all purposes. The aromatic acetylenic monomers or prepolymer component used to form the copolymers according to the present invention may be an aromatic acetylenes having the following formula:

I where $R^1$ is —C≡Cφ, and where $R^2$, $R^3$, $R^4$, $R^5$ and $R^6$ are independently selected from the group consisting of alkyl, alkenyl, alkynyl, and aryl functional groups (all of which may be substituted or unsubstituted), —H, and $R^1$ at least one of $R^2$ through $R^6$ being $R^1$;
a mixture of aromatic acetylenic monomers according to formula I; a prepolymer made by oligomerizing an aromatic acetylenic monomer according to formula I to an oligomeric mixture; a prepolymer made by oligomerizing a mixture of aromatic acetylenic monomers according to formula I to an oligomeric mixture; or a mixture of the above.

One group of acetylenic components useful in the copolymer according to the present invention and having at least three —C≡Cφ groups, are monomers of the general formula:

II where $R^1$ through $R^4$ are as defined above;
mixtures of aromatic acetylenic monomers of formula II; prepolymers made by oligomerizing an aromatic acetylenic monomer of formula II to an oligomeric mixture; prepolymers made by oligomerizing a mixture of aromatic acetylenic monomers of formula II to an oligomeric mixture; and mixtures thereof.

Monomers and prepolymers with high C/H ratios (≧1.5) are preferred, due to the characteristically smaller volumes of gases evolves from these monomers and prepolymers. Consequently, pentakis(phenylethynyl)benzene, 1,2,3,4-tetrakis(phenylethynyl)benzene, and 1,2,4,5-tetrakis(phenylethynyl)benzene are particularly preferred.

The aromatic acetylenic monomers and prepolymers used to make the copolymer of the present invention are preferably synthesized by oligomerizing the appropriate polyhalobenzene with phenylacetylene in the presence of a secondary or tertiary amine and an appropriate catalyst. The preferred polyhalobenzene is the appropriate polybromobenzene. For example, to synthesize 1,2,3-tris(phenylethynyl)benzene, the preferred polybromobenzene reagent is 1,2,3-tribromobenzene. The preferred secondary or tertiary amine is $Et_2NH$, diisopropyl amine, or $Et_3N$. The preferred catalyst is a palladium catalyst, most preferably a palladium/copper catalyst. This is a simple, high yield, single step cross-coupling reaction.

Aromatic acetylenic monomers and prepolymers that are useful according to the present invention include the following monomers whose preparation is described generally or specifically, for the first time, in the aforementioned patent application:

where $R^1$ is as defined above. Mixtures of these monomers, prepolymers made by oligomerizing one of these monomers to an oligomeric mixture, prepolymers made by oligomerizing a mixture of these monomers to an oligomeric mixture, as well as mixtures thereof, may also be used as the aromatic acetylenic component.

The aromatic acetylenic monomer or prepolymer component may also be, or at least include, one or more prepolymers formed, for example, by reaction of one or more meta and/or trans monomers of:

where R=H, to form:

by reaction of one or more meta and/or trans monomers of:

and phenylacetylene, in the presence of a cuprous salt, such as CuCl air or $O_2$, where R=φ, to form:

or by nickel catalyzed reaction of meta and trans where R=H, to form:

where a is an integer having a value $\geq 1$, b is an integer having a value $\geq 1$ and c is an integer having a value $\geq 1$. This nickel-catalyzed reaction is discussed, for example, in Report SSD-TR-90-013, A Katzman, "Polyarylacetylene Resin Composites," Materials Sciences Laboratory, Laboratory Operations, The Aerospace Corporation, El Segundo, Calif., prepared for Space Systems Division, Air Force Systems Command, Los Angeles Air Force Base, Los Angeles, Calif. (2 Apr. 1990), the entirety of which is incorporated by reference herein for all purposes. Phenylacetylene, a chemical analog of the meta and/or trans monomers, contains only a single active acetylenic group and can be co-cyclooligomerized with the aromatic acetylenic monomers. This coprocessing leads to a prepolymer that is less cross-linked and, therefore, less viscous when melted.

The carborane-(siloxane or silane)-unsaturated hydrocarbon based polymers component of the copolymer of the present invention has the general formula:

where:

(1) n is an integer from 1 to 12 and u, u', y and y" are positive integers;

(2) $-(C\equiv C)_n$- represents an unconjugated acetylenic moiety or a conjugated acetylenic moiety when n is an integer greater than 1;

(3) $R^7$, $R^8$, $R^9$, $R^{10}$, $R^{11}$, $R^{12}$, $R^{13}$ and $R^{14}$ represent hydrocarbon moieties or halosubstituted (for example, fluorinated) hydrocarbon moieties, and may be saturated or unsaturated;

(4)

represents said carboranyl group; and (5) q and q' are integers from 3 to 16;

(6) x represents an integer greater than or equal to zero ($x \geq 0$)

(7) x' represents an integer greater than or equal to zero ($x' \geq 0$);

(8) y' is a integer having a value of greater than or equal to zero ($y' \geq 0$) ;

(9) A is selected from the group consisting of O, an aliphatic bridge, and aryl bridge and mixtures thereof;

(10) E is selected from the group consisting of O, an aliphatic bridge, and aryl bridge and mixtures thereof or may be a mixture of such carborane-(siloxane or silane-)unsaturated hydrocarbon based polymers.

In addition, E and/or A may further be selected from the group consisting of an aliphatic bridge of about 1 to about 20 carbon atoms, an aryl bridge of about 5 to about 40 carbon atoms, or mixtures thereof. Furthermore, A and E may be the same or different. The preparation and structure of these compounds is fully described in U.S. patent application Ser. No. 08/337,012, filed Nov. 7, 1994, entitled LINEAR CARBORANE-(SILOXANE OR SILANE)-ACETYLENE BASED COPOLYMERS, by Keller et al., and in U.S. patent application Ser. No. 08/337,013, filed Nov. 7, 1994, entitled HIGH TEMPERATURE THERMOSETS AND CERAMICS DERIVED FROM LINEAR CARBORANE (SILOXANE OR SILANE)ACETYLENE COPOLYMERS, by Keller et al., both of which are incorporated by reference herein in their entirety, for all purposes.

These carborane-(siloxane or silane)-unsaturated hydrocarbon based polymers, with repeating units containing at least one alkynyl or acetylenic group and at least one bis(silyl or siloxanyl)carboranyl group, are designed to take advantage of the thermo-oxidative stability of inorganics and the processability of organics. The carborane-(siloxane or silane)-unsaturated hydrocarbon based polymers where y' equals zero and E=oxygen, and their preparation, are fully described in U.S. Pat. No. 5,272,237, issued Dec. 21, 1993, to Keller et al., the entirety of which is incorporated herein by reference for all purposes. The general formula of the carborane-(siloxane or silane)-unsaturated hydrocarbon based polymers taught therein is:

where $-(C\equiv)_{\overline{n}}$, $R^7$ through $R^{10}$, q, q', n, u,
x and y have the values stated above.

The general chemical scheme for synthesizing these linear polymers is illustrated by the following exemplary synthesis:

(step 1)

(step 2)

where, in the previously given general formulas:
(1) n=2, u=x=1, and y is a positive integer;
(2) $-(C\equiv C)_{\overline{n}}$ represents a conjugated acetylenic moiety where n=2;
(3) $R^7=R^8=R^9=R^{10}=CH_3$;
(4)

represents said carboranyl group; and
(5) q=q'=10;
(6) Z is selected from the group consisting of F, Cl, Br and I;
(7) Li—$(C\equiv C)_n$—Li represents a dilithio salt where n=2; and
(8) n-BuLi represents n-butyllithium.

It should be noted that if trichloroethylene is used in step 1 instead of hexachlorobutadiene, a salt of ethyne or acetylene is formed in step 1 where n =1. Consequently, an ethynyl moiety is incorporated into the polymer produced in step 2 where n=1. By using hexachlorobutadiene in step 1, the salt of butadiyne is formed where n=2. In turn, a butadiyne moiety is incorporated into polymer (2') where n=2. In order to form a polymer where n =3, a salt of hexatriyne needs to be formed in step 1. The synthesis of the disodium salt of hexatriyne is given in the article by Bock and Seidl, *d-orbital Effects in Silicon Substituted π-Electron Systems. Part XII. Some Spectroscopic Properties of Alkyl and Silyl Acetylenes and Polyacetylenes*, J. CHEM. SOC. (B), 1158 (1968) at pp. 1159. Thus, by forming the appropriate alkynyl salt, the length of the alkynyl moiety, represented by the value of n, incorporated into the polymer formed in step 2 can be controlled. Acetylenic derivatives having the general formula $H(C\equiv C)_nH$ can be readily converted into the dilithio salts by reacting with n-butyllithium. The respective dilithio salts can then be incorporated into the backbone of polymers (2) as shown in the aforementioned step 2. Typically, the value of n can be varied from 1 to 12, more often from 1 to 10 and 1 to 8, most often from 1 to 6 and, in particular, from 1 to 3 and 1 to 2. Acetylenic derivatives having the general formula $H(C\equiv C)_nH$ can be readily formed by the synthesis given by Eastmond et al. in *Silylation as a Protective Method for Terminal Alkynes in Oxidative Couplings—A General Synthesis of the Parent Polyynes*, 28 Tetrahedron 4601 (1972).

Furthermore, a variety of compounds can be produced that have structures similar to that of compound (1') shown in step 2. One variation includes replacing the methyl groups attached to the Si with other hydrocarbon or aromatic moieties. Typical reactions synthesizing disubstituted dichloro silanes of varying size (varying values of u) and having different R groups are known in the art:

where M' is a group IA metal or alloy. The above reaction is cited by Zeldin et al. (Editors) in Inorganic and Organometallic Polymers, published by American Chemical Society, Washington, DC (1988) at 44 and 90. The value of u can be varied, typically, from 1 to 1000, more often from 1 to 500 and 1 to 250, most often from 1 to 100 and 1 to 10, and, in particular, from 1 to 6. Another variation includes controlling the values of x in addition to that of u (in step 2).

Synthesis of a variation of compound (1') where u=1 and x=0 and Z=Cl is given by Papetti et al. in *A New Series of Organoboranes. VI. The Synthesis and Reactions of Some*

*Silyl Neocarboranes*, 3 INORG. CHEM. 1448 (1964) at 1449 under the caption "C,C'-Bis (methyldichlorosilyl) neocarborane (IV)." The synthesis of compound (1') where u=1 and x=1 and Z=Cl is given by Papetti et al. in *A New Series of Organoboranes. VII. The Preparation of Poly-m-carboranylenesiloxanes*, 4 Journal of Polymer science: Part A-1, 1623 (1966) at 1630 under the caption "Compound (VII)." Synthesis of a variation of compound (1') where u=1 and x=2 and Z=Cl is given by Scott et al. in *Icosahedral Carboranes. XV. Monomeric Carboranylenesiloxanes*, 9 Inorg. Chem. 2597 (1970) at 2599 under the caption "1,7-Bis(5-chlorohexamethyltrisiloxanyl) -m-carborane (IV)."

While leaving u=1, the value of x can be varied, typically, from 0 to 1000, more often from 0 to 500 and 0 to 250, most often from 0 to 10, and, in particular, from 0 to 2 by the following proposed exemplary reaction scheme:

where x and w are integers greater than or equal to 0 ($x \geq 0$; $w \geq 0$) and u is a positive integer. Following the scheme in the aforementioned steps 1 and 2, the linear polymers (2) can be formed by reacting a salt of an alkyne or a respective Grignard reagent with compound (1):

(step 2)

where, in the previously described general formulas:

(1) n is an integer from 1 to 12 and u and y are positive integers;

(2) $-(C \equiv C)_n-$ represents an unconjugated acetylenic moiety or a conjugated acetylenic moiety when n is an integer greater than 1;

(3) $R^7$, $R^8$, $R^9$ and $R^{10}$ represent hydrocarbon or aromatic moieties;

(4)

represents said carboranyl group;

(5) q and q' are integers from 3 to 16;

(6) Z is selected from the group consisting of F, Cl, Br and I;

(7) $M-(C \equiv C_n)-M$ represents a salt of an alkyne or the respective Grignard reagent where M is selected from the group consisting of Li, Na, K and MgX' where X' is selected from the group consisting of F, Cl, Br and I;

(8) x represents an integer greater than or equal to zero ($x \geq 0$); and (9) E=oxygen.

Alternatively, step 2 in the exemplary synthesis may be carried out as follows:

(alternate step 2)

where, in the previously described general formulas:

(1) n and n' is an integer from 1 to 12, u, u', y and y" are positive integers;

(2) $-(C\equiv C)_n-$ represents an unconjugated acetylenic moiety or a conjugated acetylenic moiety when n is an integer greater than 1;

(3) $R^7$, $R^8$, $R^9$ and $R^{10}$ represent hydrocarbon or aromatic moieties;

(4)

represents said carboranyl group;

(5) q and q' are integers from 3 to 16;

(6) Z is selected from the group consisting of F, Cl, Br and I;

(7) $M-(C\equiv C_n-)M$ represents a salt of an alkyne or the respective Grignard reagent where M is selected from the group consisting of Li, Na, K and MgX' where X' is selected from the group consisting of F, Cl, Br and I;

(8) x represents an integer greater than or equal to zero ($x \geq 0$);

(9) A=E=oxygen;

(10) y' is an integer greater than zero; and (11) x' represents an integer greater than or equal to zero ($x' \geq 0$).

The acetylenic functionality in both components of the copolymer according to the present invention provides many attractive advantages relative to other cross-linking centers. An acetylene moiety remains inactive during processing at lower temperatures and reacts thermally to form conjugated polymeric cross-links without the evolution of volatiles.

To make the material according to the present invention, a melt of the aromatic acetylenic component is copolymerized with the carborane-(siloxane or silane)-unsaturated hydrocarbon based polymer(s) component. Although any ratio of aromatic acetylenic component to carborane-(siloxane or silane)-unsaturated hydrocarbon-based polymer(s) component may be used, the oxidative stability of the pyrolyzed copolymer is a function of the amount of carborane-(siloxane or silane)-unsaturated hydrocarbon-based polymer(s) component present. Thus, the copolymers according to the present invention typically include from about 5 percent by weight to about 95 percent by weight of carborane-(siloxane or silane)-unsaturated hydrocarbon-based polymer(s) component, based on the total weight of the aromatic acetylenic component/carborane-(siloxane or silane)-unsaturated hydrocarbon-based polymer(s) component. Most preferred are from about 50/50 to about 35/65 weight percent of the carborane-(siloxane or silane)-unsaturated hydrocarbon based polymers component to aromatic acetylenic component.

Copolymerization may be accomplished by any known method of polymerizing acetylenes. For example, thermal and/or photochemical cross-linking may be employed. Typically, the acetylenic component and the carborane-(siloxane or silane)-unsaturated hydrocarbon-based polymer(s) component are mixed together, for example by blending in the melt, and then heated to cross-linking temperatures under either a non-reactive or an oxidizing atmosphere, such as air, nitrogen, an inert gas other than nitrogen (e.g., argon), or mixtures thereof. The cross-linking temperature for the acetylenic component/carborane-(siloxane or silane)-unsaturated hydrocarbonbased polymer(s) component mixture extends from about 200 to about 400° C. Typically, cross-linking may be effectively accomplished at temperatures of from about 200 to about 300° C. The aromatic acetylenic component/polymer mixture may be heated to cross-linking temperatures gradually, quickly, or in stages, with apparently little difference in the end product. During the early stages of the cross-linking reaction, both components are in a liquid state.

The copolymer formed by cross-linking may then be pyrolyzed by heating at pyrolyzing temperatures under a non-reactive or oxidizing atmosphere, such as nitrogen, air or an inert gas other than nitrogen (e.g., argon), or mixtures thereof. Removal of gaseous by-products of pyrolysis is assisted by the use of flowing non-reactive gas or air. Typically, pyrolyzing temperatures for copolymers made according to the present invention are from about 500° C. to about 1100° C., to afford ceramic material.

For pyrolyzed copolymers having a smaller ratio of aromatic acetylenic component to carborane-(siloxane or silane)-unsaturated hydrocarbon-based polymer(s) (about 65:35 or less, and preferably about 50:50 or less), aging at a temperature of from about 400° C. to about 1200° C. in air or oxygen forms a protective oxide coating. More typically, the aging temperature is about 500° C. to about 1000° C. This protective oxide coating protects the pyrolyzed copolymer or ceramic from further degradation at temperatures of about 1000° C. or more in air. The amount of weight loss upon heating the mixture or a char from the mixture to 1000° C. in air is dependant on the weight ratio of carborane-(siloxane or silane)unsaturated hydrocarbon-based polymer(s) to aromatic acetylenic component. As the amount of carborane-(siloxane or silane)unsaturated hydrocarbon-based polymer(s) is increased in the mixture, the char remaining upon pyrolysis in air to 1000° C. is also increased.

Having described the invention, the following examples are given to illustrate specific applications of the invention including the best mode now known to perform the invention. These specific examples are not intended to limit the scope of the invention described in this application.

EXAMPLES

Example 1

Synthesis of poly (butadiyne-1,7-bis (tetramethyldisiloxyl) -m-carborane ) (2')

(2')

In a typical synthesis, a 2.5M hexane solution of n-BuLi (34.2 ml, 85.5 mmol) in 12.0 ml of THF (tetrahydrofuran) was cooled to −78° C. under an argon atmosphere. Hexachlorobutadiene (5.58g, 21.4 mmol) in 2.0 ml THF was added dropwise by cannula. The reaction was allowed to warm to room temperature and stirred for 2 hr. The dilithiobutadiyne in THF was then cooled to −78° C. At this time, an equimolar amount of 1,7-bis(chlorotetramethyldisiloxyl)-m-carborane (10.22 g, 21.4 mmol) in 4.0 ml THF was added dropwise by cannula while stirring. The temperature of the reaction mixture was allowed to slowly rise to room temperature. While stirring the mixture for 1 hour, a copious amount of white solid (LiCl) was formed. The reaction mixture was poured into 100 ml of dilute hydrochloric acid resulting in dissolution of the salt and the separation of a viscous oil. The polymer was extracted into ether. The ethereal layer was washed several times with water until the washing was neutral, separated, and dried over anhydrous sodium sulfate. The ether was evaporated at reduced pressure leaving a dark-brown viscous polymer. A 97% yield (9.50 g) was obtained after drying in vacuo. GPC indicated the presence of low molecular weight species (≈500) as well as higher average molecular weight polymers (Mw≈4900, Mn≈2400). Heating of the viscous polymer under vacuum at 150° C. removed lower molecular weight volatiles giving a 92% overall yield. Major FTIR peaks (cm$^{-1}$): 2963 (C—H); 2600 (B—H); 2175 (C≡C); 1260 (Si—C); and 1080 (Si—0).

Example 2

Synthesis of 1,2,4,5-tetrakis(phenylethynyl)benzene

Phenylacetylene (4.697 g, 45.98 mmol), 1,2,4,5-tetrabromobenzene (4.113 g, 10.45 mmol), triethylamine (29.1 ml, 209 mmol), pyridine (16.9 ml, 209 mmol) and a magnetic stirring bar were added to a 250 ml round bottom flask. The flask was fitted with a septum and then chilled in an isopropanol/dry ice bath. After the flask had cooled, the mixture was degassed several times by the alternate application of partial vacuum and argon. To the flask was added palladium catalyst, which consisted of Pd(PPh$_3$)Cl$_2$ (0.147 g, 0.209 mmol), CuI (0.139 g, 0.731 mmol) and PPh$_3$ (0.294 g, 1.120 mmol). The septum was refitted and the flask was again degassed. The flask was warmed up to room temperature, then placed in an oil bath at 80° C., and stirred overnight resulting in the formation of a copious amount of a white precipitate. The product mixture was poured into 200 ml of water. The product was collected by suction filtration, washed several times with water, and dried. Recrystallization from methylene chloride and ethanol afforded 1,2,4,5-tetrakis(phenylethynyl)benzene in 84% yield; mp: found 194°–196° C., lit.193°–194° C.

Example 3

Polymerization and carbonization of 1,2,4,5-tetrakis(phenylethynyl)benzene under inert conditions 1,2,4,5-tetrakis(phenylethynyl)benzene (15.1 mg) was weighed into a TGA pan and cured by heating under a nitrogen atmosphere at 225° C. for 2 hours, at 300° C. for 2 hours, and at 400° C. for 2 hours resulting in the formation of a solid thermosetting polymeric material. During the heat treatment, the sample lost 1.1% weight. Upon cooling, a TGA thermogram was taken between 30° and 1000° C. resulting in a char yield of 85%.

Example 4

Oxidation of carbon formed from 1,2,4,5-tetrakis(phenylethynyl)benzene

A TGA thermogram was taken of the carbon residue from Example 3 between 30° and 1000° C. in a flow of air at 50 cc/min. The sample started to slowly lose weight at approximately 500° C. with catastrophic decomposition occurring between 600° and 800° C.

Example 5

One step polymerization and carbonization of 1,2,4,5-tetrakis(phenylethynyl)benzene 1,2,4,5-tetrakis(phenylethynyl)benzene (10.4 mg) was weighed into a TGA pan, cured, and carbonized by heating from 30 to 1000° C. under atmospheric conditions in nitrogen at 10° C./min. resulting in a char yield of 82%. Most of the weight loss occurred between 500° and 650° C. Between 650° and 1000° C. resulting in carbonization, only a small weight loss occurred.

Example 6

Thermogravimetric analysis in air of carbonized 1,2,4,5-tetrakis(phenylethynyl)benzene from Example 5

A TGA thermogram was taken of the carbon residue obtained in Example 5 between 30° and 800° C. in an flow of air. The carbon showed outstanding oxidative stability. The sample started to slowly loss weight at approximately 500° C. with catastrophic decomposition occurring between 600° and 800° C.

Example 7

Carbonization of 1,2,4,5-tetrakis(phenylethynyl)benzene, followed by aging at 400° C. in air A sample (15.81 mg) of 1,2,4,5-tetrakis (phenylethynyl) benzene was weighed into a platinum TGA pan and heated at 10° C./min under a nitrogen atmosphere at a flow rate of 50 cc/min to 1000° C. resulting in a char yield of 82%. Upon cooling the char was aged at 400° C. in air for 360 minutes resulting in a weight loss of 2.75%. The sample gained weight for approximately 1 hour before commencing to loss weight.

Example 8

Carbonization of 1,2,4,5-tetrakis(phenylethynyl)benzene, followed by aging at 500° C. in air A sample (15.45 mg) of 1,2,4,5-tetrakis(phenylethynyl)benzene was weighed into a platinum TGA pan and heated at 10° C./min under a nitrogen atmosphere at a flow rate of 50 cc/min to 1000° C. resulting in a char yield of 82%. Upon cooling the char was aged at 500° C. in air for 60 minutes resulting in a weight loss of approximately 9%. The sample commenced to loss weight immediately.

Example 9

Pyrolysis of poly(butadiyne-1,7-bis(tetramethyldisiloxyl)-m-carborane) (2')

A sample (24 mg) of poly(butadiyne-1,7-bis(tetramethyldisiloxyl)-m-carborane) was weighed into a platinum TGA pan and heated at 10° C./min under a nitrogen atmosphere at a flow rate of 50 cc/min to 1000° C. resulting in a ceramic yield of 87%. Upon cooling back to room temperature, the ceramic material was heating at 10° C./min to 1000° C. under a flow rate of air at 50 cc/min. During the oxidative heat treatment, the ceramic material gained weight (1-2 weight percent) attributed to oxidation on the surface.

Example 10

Pyrolysis of poly (butadiyne-1,7-bis (tetramethyldisiloxyl)-m-carborane) in air

A sample ( 13.7 mg) of poly (butadiyne-1,7-bis (tetramethyldisiloxyl) -m-carborane) was weighed into an platinum TGA pan and heated at 10° C./min under a flow of air at 50 cc/min to 1000° C. resulting in a ceramic yield of 92%. The ceramic was aged at 1000° C. for 4 hours resulting in a slight weight gain attributed to the formation of a protective layer enriched in silicon oxide. Moreover, the sample retained its structural integrity.

Example 11

Pyrolysis of 95/5 1,2,4,5-tetrakis(phenylethynyl)-benzene/poly (butadiyne-1,7-bis(tetramethyldisiloxyl)-m-carborane) blend A sample (18.64 mg) containing 95% 1,2,4,5-tetrakis(phenylethynyl)benzene and 5% poly(butadiyne-1,7-bis(tetramethyldisiloxyl) -m-carborane) was weighed into a platinum TGA pan and heated at 10° C./min under a nitrogen atmosphere at a flow rate of 50 cc/min to 1000° C. resulting in a ceramic yield of 82%. Upon cooling back to room temperature, the ceramic material was heated to 1000° C. under the previous conditions in an air flow. Oxidative degradation commenced above 500° C. Between 875° and 1000° C., the weight loss stabilized yielding a remaining char of 12%.

Example 12

Pyrolysis of 90/10 1,2,4,5-tetrakis(phenylethynyl)-benzene/poly(butadiyne-1,7-bis(tetramethyldisiloxyl)-m-carborane) blend A sample (14.80 mg) containing 90% 1,2,4,5-tetrakis(phenylethynyl)benzene and 10% poly(butadiyne-1,7-bis (tetramethyldisiloxyl) -m-carborane) was weighed into a platinum TGA pan and heated at 10° C./min under a nitrogen atmosphere at a flow rate of 50 cc/min to 1000° C. resulting in a ceramic yield of 82%. Upon cooling back to room temperature, the ceramic material was heated to 1000° C. under the previous conditions in an air flow. Oxidative degradation commenced above 550° C. Between 875° and 1000° C., the weight loss stabilized yielding an oxidative char of 23%.

Example 13

Pyrolysis of 90% 1,2,4,5-tetrakis(phenylethynyl)benzene and 10% poly(butadiyne-1,7-bis(tetramethyldisiloxyl)-m-carborane) copolymer A sample (17.83 mg) containing 90% 1,2,4,5-tetrakis(phenylethynyl)benzene and 10% poly(butadiyne-1,7-bis(tetramethyldisiloxyl) -m-carborane) was weighed into a platinum TGA pan and cured to a thermoset by heating at 225° C. for 2 hours, at 300° C. for 2 hours, and at 400° C. for 2 hours under a nitrogen atmosphere at a flow rate of 50 cc/min. During the heat treatment, the sample lost approximately 2% weight. Upon cooling to room temperature, the thermoset was heated at 10° C./min to 1000° C. under a flow of nitrogen resulting in a ceramic yield of 82%. Upon cooling back to room temperature, the ceramic material was heated to 1000°C. under the previous conditions in an air flow. Oxidative degradation commenced above 550° C. Between 875° and 1000° C., the weight loss stabilized yielding a oxidative char of 23%.

Example 14

Pyrolysis of 80/20 1,2,4,5-tetrakis(phenylethynyl)-benzene/poly (butadiyne-1,7-bis(tetramethyldisiloxyl)-m-carborane) blend A sample (14.39 mg) containing 80% 1,2,4,5-tetrakis(phenylethynyl)benzene and 20% poly(butadiyne-1,7-bis (tetramethyldisiloxyl) -m-carborane) was weighed into a platinum TGA pan and heated at 10° C./min under a nitrogen atmosphere at a flow rate of 50 cc/min to 1000° C. resulting in a ceramic yield of 82%. Upon cooling back to room temperature, the ceramic material was heated to 1000° C. under the previous conditions in an air flow. Oxidative degradation commenced above 550° C. and afforded an oxidative char of 58% at 1000° C.

Example 15

Pyrolysis of 65/35 1,2,4,5-tetrakis(phenylethynyl)-benzene/poly (butadiyne-1,7-bis(tetramethyldisiloxyl)-m-carborane) blend A sample (18.0 mg) containing 65% 1,2,4,5-tetrakis(phenylethynyl)benzene and 35% poly(butadiyne-1,7-bis(tetramethyldisiloxyl) -m-carborane) was weighed into a platinum TGA pan and heated at 10° C./min under a nitrogen atmosphere at a flow rate of 50 cc/min to 1000° C. resulting in a ceramic yield of 82%. Upon cooling back to room temperature, the ceramic material was heated to 1000° C. under the previous conditions in an air flow. Oxidative degradation commenced above 550° C. and afforded an oxidative char of 92% at 1000° C.

Example 16

Pyrolysis of 50/50 1,2,4,5-tetrakis(phenylethynyl)-benzene/poly (butadiyne-1,7-bis(tetramethyldisiloxyl)-m-carborane) blend A sample (16.0 mg) containing 50% 1,2,4,5-tetrakis(phenylethynyl)benzene and 50% poly(butadiyne-1,7-bis(tetramethyldisiloxyl) -m-carborane) was weighed into a platinum TGA pan and heated at 10° C./min under a nitrogen atmosphere at a flow rate of 50 cc/min to 1000° C. resulting in a ceramic yield of 83%. Upon cooling back to room temperature, the ceramic material was heated to 1000° C. under the previous conditions in an air flow. Oxidative degradation commenced above 900° C. and afforded an oxidative char of 99% at 1000° C.

Example 17

Aging of carbonized 80/20 1,2,4,5-tetrakis (phenylethynyl)benzene/poly (butadiyne-1,7-bis (tetramethyldisiloxyl)-m-carborane) blend The oxidized char from Example 14 was aged in sequence at 600° C. and 700° C. in air for 10 hours at each temperature. During the 600° C. heat treatment, the sample lost 19% weight. On increasing the temperature to 700° C., the weight loss stabilized immediately. Total weight lost at 600° C. and 700° C. was 22%.

Example 18

Aging of carbonized copolymer of 65% 1,2,4,5-tetrakis(phenylethynyl)benzene and 35% poly(butadiyne-1,7-bis (tetramethyldisiloxyl)-m-carborane)

The oxidized char from Example 15 was aged in sequence at 600° C. and 700° C. in air for 10 hours at each temperature. During the 600° C. heat treatment, the sample did not loss any weight. On increasing to 700° C., the sample lost 0.4% weight during the heat treatment.

Example 19

Pyrolysis of 65/35 1,2,4,5-tetrakis(phenylethynyl)benzene/poly (butadiyne-1,7-bis(tetramethyldisiloxyl)-m-carborane) blend, followed by aging at 1000° C.

A sample (16.89 mg) containing 65% 1,2,4,5-tetrakis(phenylethynyl)benzene and 35% poly(butadiyne-1,7-bis (tetramethyldisiloxyl)-m-carborane) was weighed into a platinum TGA pan and heated at 10° C./min under a nitrogen atmosphere at a flow rate of 50 cc/min to 1000° C. resulting in a ceramic yield of 83%. Upon cooling back to room temperature, the ceramic material was heated to 1000° C. under the previous conditions in an air flow and aged at 1000° C. for 2 hours resulting in a weight loss of 15%.

Example 20

Pyrolysis of 50/50 1,2,4,5-tetrakis(phenylethynyl)-benzene/poly (butadiyne-1,7-bis(tetramethyldisiloxyl)-m-carborane) blend, followed by aging at 1000° C.

A sample (14.45 mg) containing 50% 1,2,4,5-tetrakis(phenylethynyl)benzene and 50% poly(butadiyne-1,7-bis(tetramethyldisiloxyl)-m-carborane) was weighed into a platinum TGA pan and heated at 10° C./min under a nitrogen atmosphere at a flow rate of 50 cc/min to 1000° C. resulting in a ceramic yield of 83%. Upon cooling back to room temperature, the ceramic material was heated to 1000° C. under the previous conditions in an air flow and aged at 1000° C. for 2 hours resulting in a weight loss of 6.5%.

Example 21

Pyrolysis of 80/20 1,2,4,5-tetrakis(phenylethynyl)-benzene/poly (butadiyne-1,7-bis(tetramethyldisiloxyl)-m-carborane) blend, followed by aging at 400° C.

A sample (18.39 mg) containing 80% 1,2,4,5tetrakis (phenylethynyl) benzene and 20% poly(butadiyne-1,7-bis (tetramethyldisiloxyl)-m-carborane) was weighed into a platinum TGA pan and heated at 10° C./min under a nitrogen atmosphere at a flow rate of 50 cc/min to 1000° C. resulting in a ceramic yield of 83%. Upon cooling the charred sample was aged at 400° C. in air. The sample initially gained weight (about 0.48%). After 12 hours, the sample had lost about 3.5% weight.

Example 22

Pyrolysis of 80/20 1,2,4,5-tetrakis(phenylethynyl)-benzene/poly (butadiyne-1,7-bis(tetramethyldisiloxyl)-m-carborane) blend, followed by aging at 500° C.

A sample (18.96 mg) containing 80% 1,2,4,5-tetrakis(phenylethynyl)benzene and 20% poly(butadiyne-1,7-bis (tetramethyldisiloxyl)-m-carborane) was weighed into a platinum TGA pan and heated at 10° C./min under a nitrogen atmosphere at a flow rate of 50 cc/min to 1000° C. resulting in a ceramic yield of 83%. Upon cooling the charred sample was aged at 500° C. in air. The sample started to loss weight after only a few minutes. After 5 hours, the sample had lost about 25% weight.

Example 23

Pyrolysis of 50/50 1,2,4,5-tetrakis(phenylethynyl)-benzene/poly (butadiyne-1,7-bis(tetramethyldisiloxyl)-m-carborane) blend, followed by aging in sequence at 400° C. and at 500° C. in air A sample (20.55 mg) containing 50% 1,2,4,5-tetrakis(phenylethynyl)benzene and 50% poly(butadiyne-1,7-bis (tetramethyldisiloxyl)-m-carborane) was weighed into a platinum TGA pan and heated at 10° C./min under a nitrogen atmosphere at a flow rate of 50 cc/min to 1000° C. resulting in a ceramic yield of 84%. Upon cooling the charred sample was aged at 400° C. in air for 1400 minutes. The sample quickly gained weight (0.42%). At 1200 minutes, the sample still showed a weight gain of 0.38%. After 1300 minutes at 400° C., no weight changes were detected. An oxidized film had apparently formed that totally protected the system against oxidation at 400° C. The temperature was increased to 500° C. and the sample aged in air for 1400 minutes. During the first 100 minutes, the sample lost approximately 0.35% weight. Between 100 and 1400 minutes, the sample slowly lost some weight. At 1400 minutes of heat treatment at 500, the sample had lost about 1.4% weight or retained 98.6% weight.

Example 24

Pyrolysis of 50/50 copolymer of 1,2,4,5-tetrakis(phenylethynyl)benzene and poly(butadiyne-1,7-bis (tetramethyldisiloxyl)-m-carborane) to 600° C., followed by aging at 400° C. in air A sample (16.76 mg) containing 50% 1,2,4,5-tetrakis(phenylethynyl)benzene and 50% poly(butadiyne-1,7-bis (tetramethyldisiloxyl)-m-carborane) was weighed into a platinum TGA pan and cured by heating at 250° C. for 2 hours, at 350° C. for 2 hours, and at 500° C. for 3 hours under a nitrogen atmosphere. During the heat treatment to 500° C., the sample lost approximately 10% weight. Upon cooling, the cured sample was aged at 400° C. in air at a flow rate of 50cc/min. Heat treatment up to 250 minutes resulted in a weight gain of about 2.8%. Further heating resulted in a gradual loss of weight. At about 550 minutes of heating, the weight was at 100% of the starting sample. After 1200 minutes, the sample still retained 94.2% of the original weight.

Example 25

Sandwich of 1,2,4,5-tetrakis(phenylethynyl)benzene between two polymeric thermosetting layers prepared from poly(butadiyne-1,7-bis(tetramethyldisiloxyl)-m-carborane)

A polymeric sample was fabricated in an aluminum planchet by sandwiching the thermoset from 1,2,4,5-tetrakis(phenylethynyl)benzene between two polymeric thermosetting layers prepared from poly(butadiyne-1,7-bis(tetramethyldisiloxyl)-m-carborane). The sandwiched polymer is prepared as follows: 0.5 gm of poly(butadiyne-1,7-bis(tetramethyldisiloxyl)-m-carborane) was placed in an aluminum planchet and cured by heating at 300° C. for 2 hours. At this time after cooling back to room temperature, 1.1 gm of 1,2,4,5-tetrakis(phenylethynyl)benzene was placed on top of the thermoset from poly(butadiyne-1,7-bis(tetramethyldisiloxyl)-m-carborane) and cured by heating at 250° C. for 2 hours resulting in gelation. Next, 0.5 gm of poly(butadiyne-1,7-bis (tetramethyldisiloxyl)-m-carborane) was added. The layered polymeric composition was then heated at 300° C. for 2 hours, at 400° C. for 2 hours, and at 500° C. for 3 hours. The polymeric composition was slowly cooled back to room temperature.

Example 26

Pyrolysis of sandwich of 1,2,4,5-tetrakis(phenylethynyl)benzene between two polymeric thermosetting layers prepared from poly(butadiyne-1,7-bis(tetramethyldisiloxyl)-m-carborane)

The polymer from Example 25 was slowly heated to 1000° C. at 1° C./min under an argon atmosphere and held at this temperature for 1 hour. The composition containing the carbon sandwiched between the ceramic outer layer was cooled at 1° C./min back to room temperature.

RESULTS FROM EXAMPLES

Figure 1:
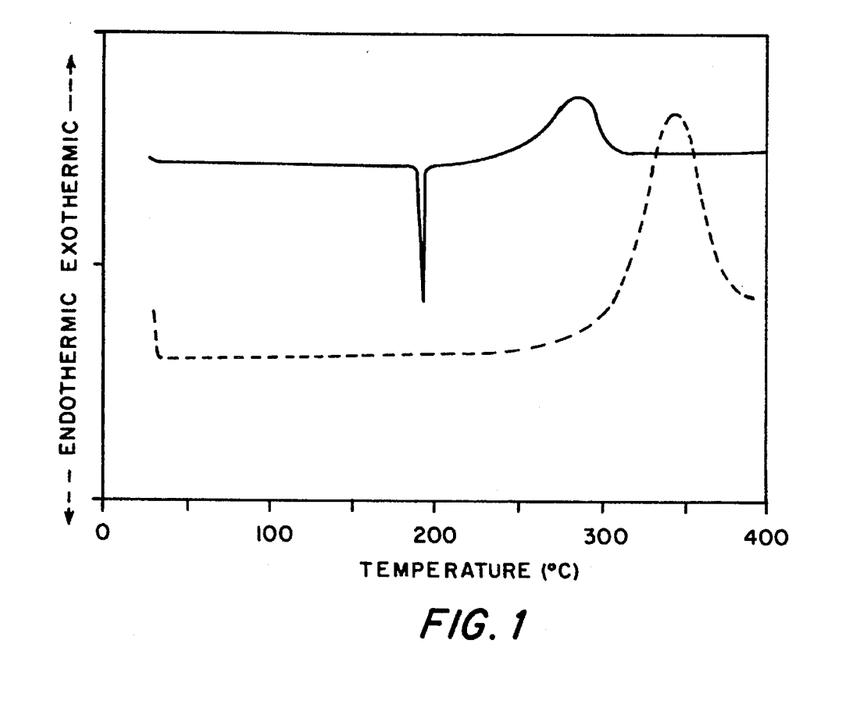
FIG. 1 is a differential scanning calorimetry (DSC) thermogram of 1,2,4,5-tetrakis(phenylethynyl)benzene and poly(butadiyne-1,7-bis(tetramethyldisiloxyl) -m-carborane).

Cure studies of 1,2,4,5-tetrakis(phenylethynyl)benzene and poly(butadiyne-1,7-bis(tetramethyldisiloxyl)-m-carborane) were performed by DSC analysis to 400° C. (see FIG. 1). A thermogram of 1,2,4,5-tetrakis(phenylethynyl)benzene shows an endothermic transition (m.p.) at 195° C. and an exothermic transition at 290° C. Upon cooling another thermogram was obtained showing a $T_g$ at 164° C. and a strong exotherm commencing at approximately 300° C. A sample of 1,2,4,5-tetrakis(phenylethynyl)benzene that had been cured by heating under conditions at 225° C. for 2 hours, at 300° C. for 2 hours, and at 400° C. for 4 hours did not exhibit a $T_g$, which enhances its importance for structural applications. A DSC thermogram of poly(butadiyne-1,7-bis(tetramethyldisiloxyl)-m-carborane) shows a small broad exotherm from about 150 to 225° C. and was attributed to the presence of a small amount of primary terminated acetylenic units. This peak was absent when poly(butadiyne-1,7-bis (tetramethyldisiloxyl)-m-carborane) was heated at 150° C. for 30 minutes under reduced pressure. These low molecular weight components must be removed or reacted to ensure the formation of a void-free thermoset. A larger broad exotherm commencing at 250° C. and peaking at 350° C. was attributed to the reaction of the acetylene functions to form the cross-links. This exotherm was absent after heat treatment of poly(butadiyne-1,7-bis (tetramethyldisiloxyl)-m-carborane) at 320° C. and 375° C., respectively, for 30 minutes. The polymer poly(butadiyne-1,7-bis (tetramethyldisiloxyl)-m-carborane) could be degassed at temperatures up to 150° C. without any apparent reaction of the acetylenic units. Compound poly(butadiyne-1,7-bis (tetramethyldisiloxyl)-m-carborane) displays only an exothermic transition at 346° C. The exothermic transitions are attributed to polymerization through the acetylenic units.

DSC analyses of blends of 1,2,4,5-tetrakis(phenylethynyl)benzene and poly(butadiyne-1,7-bis (tetramethyldisiloxyl)-m-carborane) show a homogeneous reaction initially to a thermoset. The DSC scans of the blends show only one cure exotherm for each of the compositions studied. For example, weight percent mixtures (90/10 and 50/50) of 1,2,4,5-tetrakis(phenylethynyl)benzene and poly(butadiyne-1,7-bis (tetramethyldisiloxyl)-m-carborane) display endotherms (m.p. 1,2,4,5-tetrakis(phenylethynyl)benzene) and exotherms (polymerization reaction) peaking at 195° C., 293° C. and 193° C., 300° C. respectively. It is apparent from the observed cure temperature for the blends that 1,2,4,5-tetrakis(phenylethynyl)benzene being more reactive initially forms radicals that are not selective in the chain propagation reaction with the acetylenic units of both 1,2,4,5-tetrakis(phenylethynyl)benzene and poly(butadiyne-1,7-bis (tetramethyldisiloxyl)-m-carborane). Charred samples that have been heat treated to 1000° C. do not exhibit characteristic endothermic and exothermic transitions. Pyrolysis Studies. The thermal stability of 1,2,4,5-tetrakis(phenylethynyl)benzene was determined under inert conditions. During the heat treatment to 1000° C., the acetylenic compound 1,2,4,5-tetrakis(phenylethynyl)benzene is initially converted into a dark brown thermoset polymer, which behaves as a precursor polymer for further conversion into carbon. At 1000° C. the sample exhibits a char yield of 85% under atmospheric conditions. Very little weight loss (1-2%) occurred below 500° C.

Figure 2:
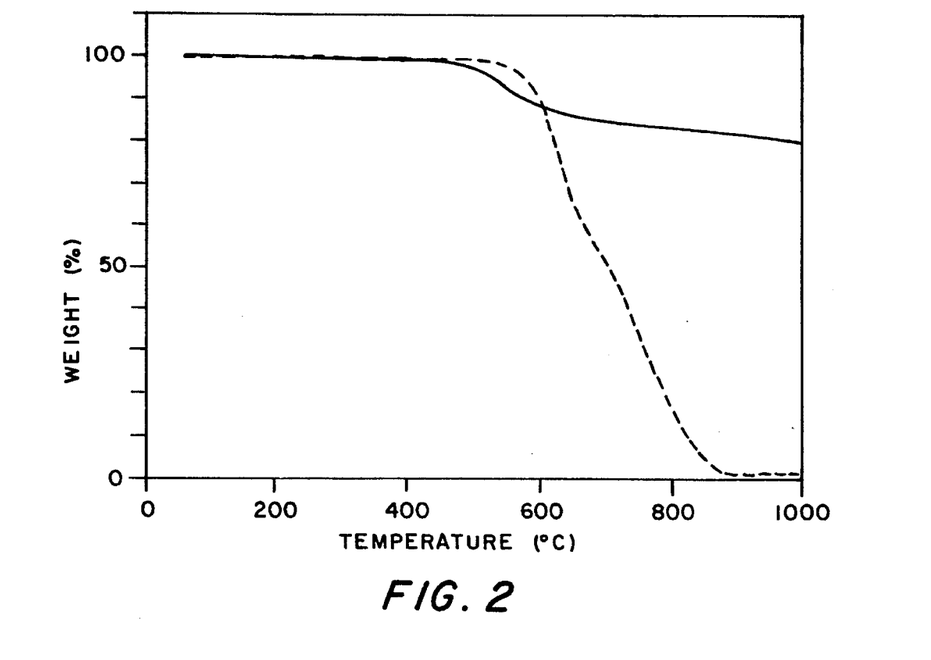
FIG. 2 shows the thermal stability, to 1000° C., of 1,2,4,5-tetrakis (phenylethynyl) benzene (solid line) under nitrogen atmosphere and carbon char from 1, 2, 4, 5-tetrakis (phenylethynyl) benzene (dash line) in a flow of air.
Figure 3:
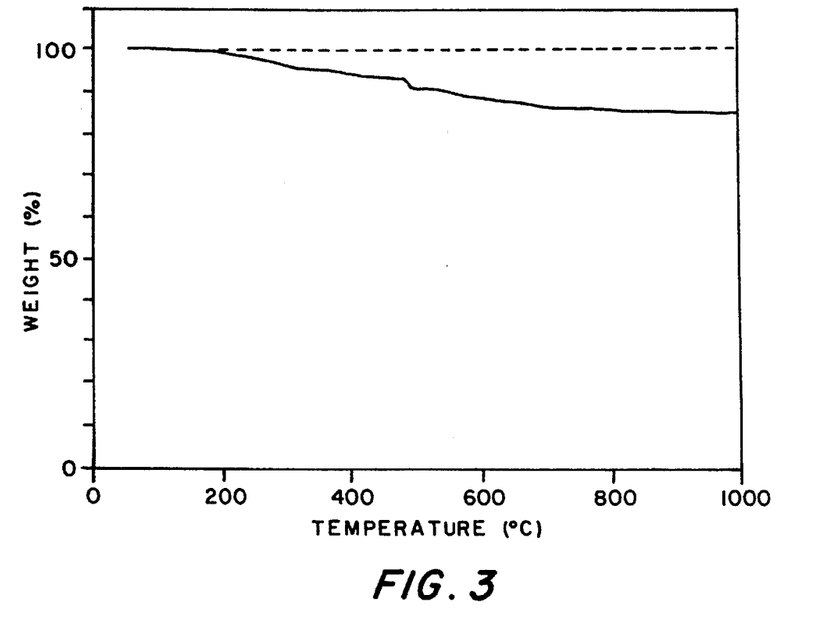
FIG. 3 shows the thermal stability to 1000 ° C. of poly (butadiyne-1,7-bis (tetramethyldisiloxyl) -m-carborane) (solid line) and ceramic char from poly (butadiyne-1,7-bis(tetramethyldisiloxyl) -m-carborane) (dash line) in a flow of air.

The thermal and oxidative stability of poly(butadiyne-1,7-bis (tetramethyldisiloxyl)-m-carborane) and its conversion into a ceramic were studied by thermogravimetric analysis (TGA). The TGA studies were determined between 50 and 1000° C. in both nitrogen and air atmospheres (FIGS. 2 and 3). Pyrolysis of poly(butadiyne-1,7-bis (tetramethyldisiloxyl)-m-carborane) to 1000° C. in nitrogen, resulted in a ceramic yield of 85%. Further heat treatment at 1000° C. for 12 hours resulted in no additional weight loss. When the ceramic material was cooled back to 50° C. and rescanned to 1000° C. in air, the sample gained weight ($\approx$2%) attributed to surface oxidation. A TGA thermogram of poly(butadiyne-1,7-bis (tetramethyldisiloxyl)-m-carborane), which was heated to 1000° C. in air, exhibited a ceramic yield of 92%. Further TGA aging studies of the ceramic in air revealed that additional weight loss did not occur and that the sample actually increased in weight as observed previously. When the aged sample was cooled and heated to 1000° C. under nitrogen, no weight changes were observed. These observations show the stability of the ceramic material under both inert and oxidative conditions.

Figure 4:
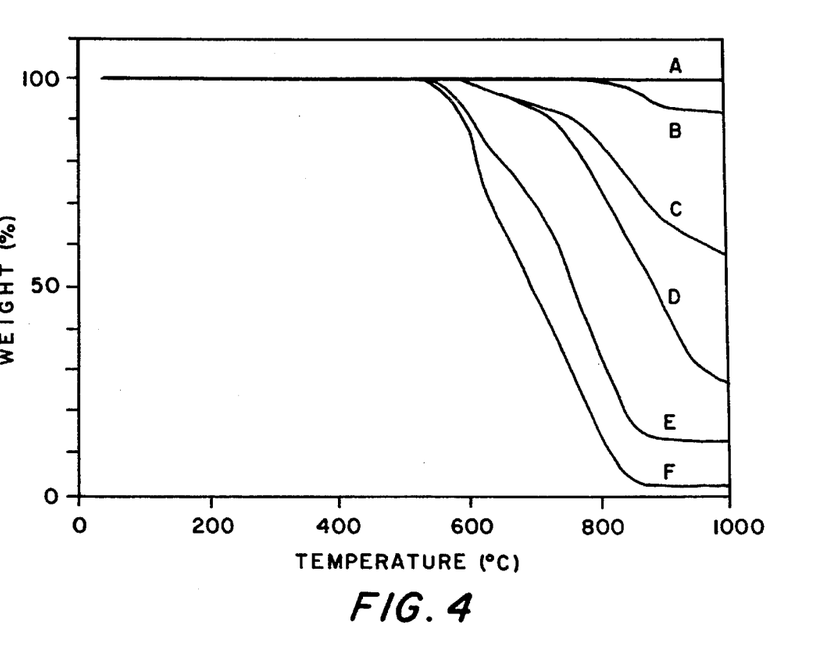
FIG. 4 shows the oxidative stability of char formed from various weight percent of 1,2,4,5-tetrakis(phenylethynyl)benzene and poly(butadiyne-1,7-bis(tetramethyldisiloxyl)-m-carborane). The weight percentages of 1,2,4,5-tetrakis(phenylethynyl)benzene and poly(butadiyne-1,7-bis(tetramethyldisiloxyl)-m-carborane) in the chars from which each line was obtained is as follows: line A, 50/50; line B, 65/35; line C, 80/20; line D, 90/10; line E, 90/5; line F, 100/0.
Figure 5:
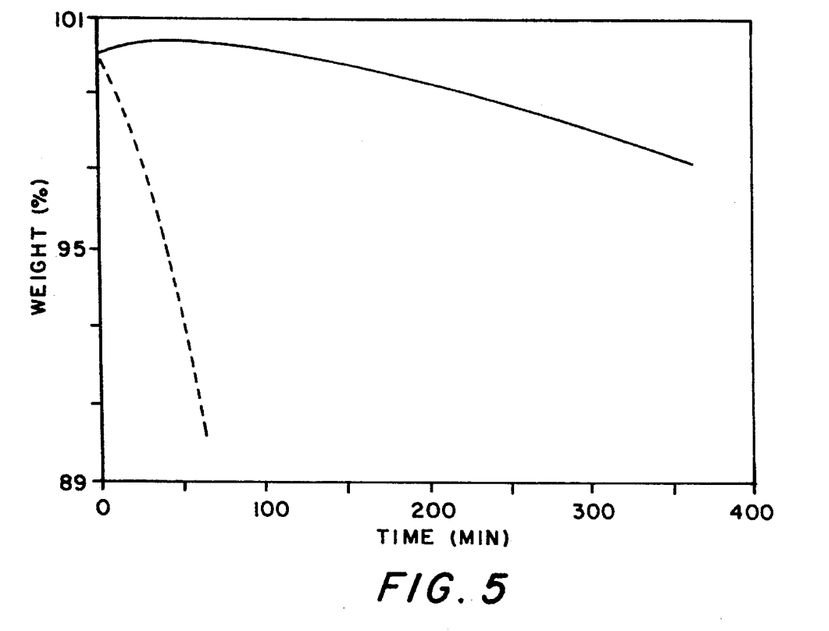
FIG. 5 shows the results of oxidative aging studies on carbon char from 1,2,4,5-tetrakis(phenylethynyl)benzene at 400° C. (solid line) and 500° C. (dash line).

The thermal and oxidative stability of various mixtures of 1,2,4,5-tetrakis(phenylethynyl)benzene and poly(butadiyne-1,7-bis (tetramethyldisiloxyl)-m-carborane) was determined to 1000° C. by TGA analysis. Studies have been performed on samples containing 0–50% by weight of poly(butadiyne-1,7-bis(tetramethyldisiloxyl)-m-carborane). The scans were run at 10° C./min at a flow of 50 cc/min in either nitrogen or air. Samples containing various amounts of 1,2,4,5-tetrakis(phenylethynyl)benzene and poly(butadiyne-1,7-bis (tetramethyldisiloxyl)-m-carborane) afforded char yields of 85% when heated to 1000° C. under inert conditions. Upon cooling, the carbon/ceramic mass was reheated to 1000° C. in air. The oxidative stability of the charred mass was found to be a function of the amount of poly(butadiyne-1,7-bis(tetramethyldisiloxyl)-m-carborane) present. Charred samples obtained from 5, 10, 20, 35, and 50% by weight of poly(butadiyne-1,7-bis(tetramethyldisiloxyl)-m-carborane) showed chars of 12, 27, 58, 92, and 99.5%, respectively, when heated to 1000° C. in air (see FIG. 4). TGA scans of the oxidized chars were completely stable in air to 1000° C. These results indicate that the oxidative stability of the copolymer and carbon/ceramic mass is enhanced as the concentration of poly(butadiyne-1,7-bis(tetramethyldisiloxyl)-m-carborane) is increased. Aging studies In Air. The carbonaceous mass produced from the pyrolysis of 1,2,4,5-tetrakis(phenylethynyl)benzene to 1000° C. under inert conditions was aged in sequence in a flow of air at 400° C. and 500° C. (see FIG. 5). Heat treatment at 400° C. resulted in an initial weight gain attributed to the absorption and interaction of oxygen with the carbon prior to oxidative breakdown. After ≈45 minutes, the sample quit gaining weight. Shortly thereafter, the sample started to gradually loss weight. After 6 hours the sample had lost ≈2.5% weight. Upon exposure to air at 500° C., the carbon char commenced to loss weight immediately. Moreover, the rate of breakdown increased as a function of time. After 1 hour, the sample had loss about 9% weight.

Isothermal aging studies were performed on the ceramic formed from poly(butadiyne-1,7-bis(tetramethyldisiloxyl)-m-carborane) under oxidative conditions. A sample of poly(butadiyne-1,7-bis (tetramethyldisiloxyl)-m-carborane) was heated under a nitrogen atmosphere to 1000° C. to afford a ceramic yield of 85%. Upon cooling, the ceramic sample was aged in air at 500°, 600°, and 700° C. After each aging study, the sample was cooled to room temperature. When heat treated at 500° C. for 20 hours, the sample gained 0.11% weight. The sample was then aged at 600° C. for 6 hours. While heating up to 50 minutes, the sample lost weight (0.25%) and then gained 0.05% weight upon heating for an additional 5 hours. After 3 hours at 600° C., the weight loss had stabilized. For heat treatment at 700° C., the sample initially lost weight (0.16%) during the first 25 minutes. Between 25 and 300 minutes, the sample gradually increased in weight (0.29%) Another sample of poly(butadiyne-1,7-bis(tetramethyldisiloxyl)-m-carborane) heated under a flow of air at 50 cc/min to 1000° C. and held at this temperature for 10 hours afforded a ceramic yield of 87%. When the ceramic was further heated in air at 500° C. for 12 hours, no apparent weight changes occurred. Regardless of the heat treatment, the samples retained their structural integrity except for some shrinkage during pyrolysis.

Figure 6:
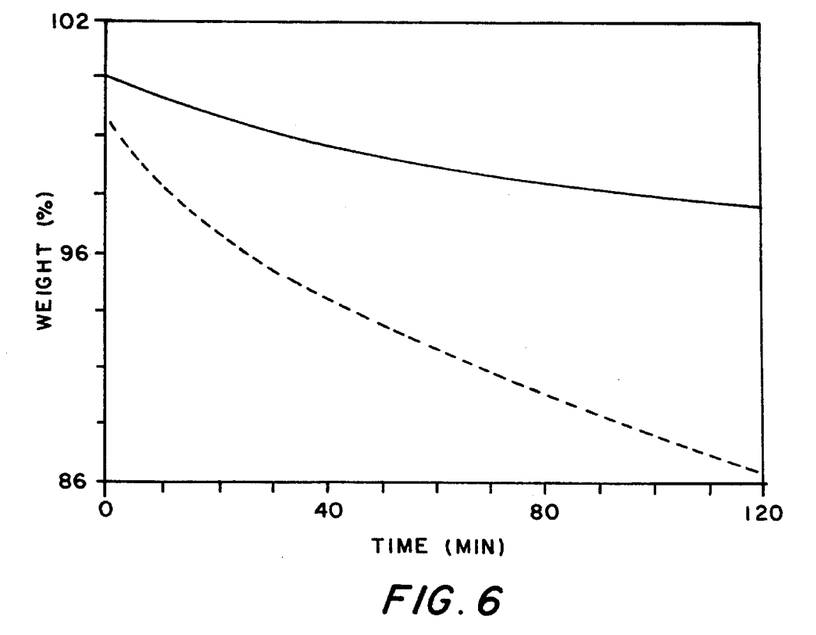
FIG. 6 shows the results of oxidative aging studies at 1000° C. on char from blends of 1,2,4,5-tetrakis(phenylethynyl)benzene and poly(butadiyne-1,7-bis(tetramethyldisiloxyl)-m-carborane). The weight percentages of 1,2,4,5-tetrakis(phenylethynyl)benzene and poly(butadiyne-1,7-bis(tetramethyldisiloxyl)-m-carborane) in the chars from which each line was obtained is as follows: solid line, 50/50; dash line, 65/35.

Two ceramic compositions that had been fabricated in a TGA pan to 1000° C. was aged at 1000° C. in air. The sample prepared from 50%/50% and 65%/35% weight blends of 1,2,4,5-tetrakis(phenylethynyl)benzene and poly(butadiyne-1,7-bis (tetramethyldisiloxyl)-m-carborane) were initially processed to 1000° C. under a nitrogen atmosphere to form a char yield of 83% in each case. Upon cooling, the chars were heat treated to 1000° C. under a flow of air. Isothermal aging of the chars in air at 1000° C. for 2 hours resulted in weight loss of 4.5 and 12.5% for the 50%/50% and 65%/35% weight compositions, respectively (FIG. 6).

Two ceramic compositions prepared by heat treatment under a nitrogen atmosphere to 1000° C. from 80%/20% and 50%/50% weight blends of 1,2,4,5-tetrakis(phenylethynyl)benzene and poly(butadiyne-1,7-bis(tetramethyldisiloxyl)-m-carborane) were aged in air at 400° C. and 500° C. for 5.5 hours. On exposure at 400° C. the char from the 80%/20% mixture immediately commenced to gain weight to a maximum of 1.48%. The sample then gradually lost weight and was at 100% weight retention after 5.2 hours of heat treatment. Heat treatment of another charred sample at 500° C. resulted in an immediate weight loss with a weight retention of 97.6% after 5 hours. The char from the 50%/50% mixture showed outstanding oxidative stability. The copolymer quickly gained about 0.42% weight with very little further weight change during the 20 hour heat treatment Upon increasing the temperature to 500° C., the polymer still displayed excellent stability with a weight retention of about 98.8% after isothermal aging for 20 hours. The oxidized film that developed during the heat treatment at 400° C. formed a protective barrier against oxidation.

Figure 7:
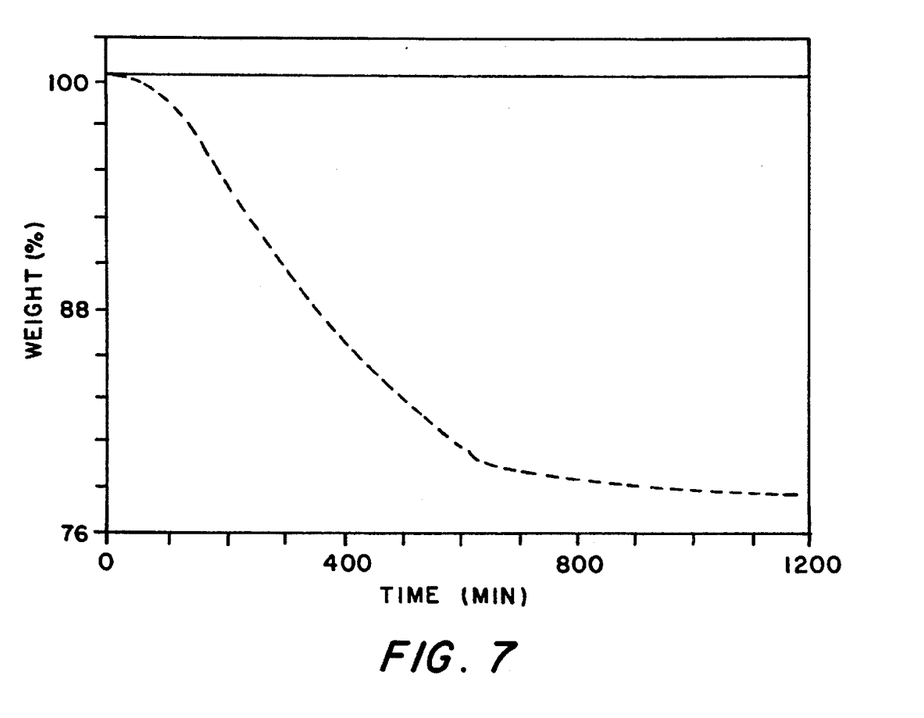
FIG. 7 shows the results of oxidative studies on chars from blends of 1,2,4,5-tetrakis (phenylethynyl) benzene and poly (butadiyne-1,7-bis (tetramethyldisiloxyl) -m-carborane) preheated to 1000° C. in a flow of air before aging at 600° C. and 700° C. The weight percentages of 1,2,4,5-tetrakis (phenylethynyl) benzene and poly (butadiyne-1,7-bis (tetramethyldisiloxyl) -m-carborane) in the chars from which each line was obtained is as follows: solid line, 50/50; dash line, 65/35.

On exposure of the copolymers formed from 1,2,4,5-tetrakis(phenylethynyl)benzene and poly(butadiyne-1,7-bis (tetramethyldisiloxyl)-m-carborane) to an oxidizing environment, a protective film initially develops that deters or alleviates further oxidation at a given temperature. The formation of the oxidized film and any weight loss associated with the exposure was accelerated by heat treatment of the carbonaceous/ceramic mass to 1000° C. in air. Such samples were prepared from 50%/50% and 65%/35% weight blends of 1,2,4,5-tetrakis(phenylethynyl)benzene and poly(butadiyne-1,7-bis(tetramethyldisiloxyl)-m-carborane) heated to 1000° C. consecutively in nitrogen and air and then isothermally aged in air in sequence for 10 hours each at 600° and 700° C. (FIG. 7). The chars from the 50%/50% and 65%/35% blends gained about 0.1% weight and lost 18%, respectively, at 600° C. During the heat treatment at 700° C. the samples lost about 0.4% and 4% weight. The superior performance of the 50%/50% blend shows that a critical amount of boron and silicon are necessary to protect a carbon-based material against oxidation.

Obviously, many modifications and variations of the present invention are possible in light of the above teachings. It is therefore to be understood that, within the scope of the appended claims, the invention may be practiced otherwise than as specifically described.

What is claimed is:

1. A copolymer formed by the copolymerization of an aromatic acetylenic component selected from the group consisting of an aromatic acetylenic monomer, a mixture of aromatic acetylenic monomers, a prepolymer made by oligomerizing an aromatic acetylenic monomer, a prepolymer made by oligomerizing a mixture of aromatic acetylenic monomers, and mixtures thereof; with a carborane-(siloxane or silane)-unsaturated hydrocarbon polymer component selected from the group consisting of a carborane(siloxane or silane)-unsaturated hydrocarbon polymer and a mixture of carborane-(siloxane or silane)-unsaturated hydrocarbon polymers.

2. The copolymer of claim 1, wherein said copolymer includes at least about 5 weight percent of said carborane-(siloxane or silane)-unsaturated hydrocarbon polymer component, based on the total weight of said aromatic acetylenic component and said carborane-(siloxane or silane)-unsaturated hydrocarbon polymer component.

3. The copolymer of claim 2, wherein said copolymer includes from about 10 weight percent to about 50 weight percent of said carborane-(siloxane or silane)-unsaturated hydrocarbon polymer component, based on the total weight of said aromatic acetylenic component and said carborane-(siloxane or silane)-unsaturated hydrocarbon polymer component.

4. The copolymer of claim 1, wherein said carborane-(siloxane or silane)-unsaturated hydrocarbon polymer component includes a carborane-(siloxane or silane)-unsaturated hydrocarbon polymer having the formula:

where:
(1) n is an integer from 1 to 12 and u, u', y and y" are positive integers;
(2) $-(C{\equiv}C)_n-$ represents an acetylenic moiety;
(3) $R^7$, $R^8$, $R^9$, $R^{10}$, $R^{11}$, $R^{12}$, $R^{13}$ and $R^{14}$ represent hydrocarbon moieties or halosubstituted hydrocarbon moieties;
(4)

represents said carboranyl group; and
(5) q and q' are integers from 3 to 16;
(6) x represents an integer greater than or equal to zero;
(7) x' represents an integer greater than or equal to zero;
(8) y' is a integer having a value of greater than or equal to zero;
(9) A is selected from the group consisting of oxygen; an aliphatic bridge; an aryl bridge; and a diradical consisting of at least two dissimilar members selected from the group consisting of oxygen, an aliphatic bridge, and an aryl bridge;
(10) E is selected from the group consisting of oxygen; an aliphatic bridge; an aryl bridge; and a diradical consisting of at least two dissimilar members selected from the group consisting of oxygen, an aliphatic bridge, and an aryl bridge; and
(2) n' is an integer from 1 to 12.

5. The copolymer of claim 4, wherein at least one of $R^7$, $R^8$, $R^9$, $R^{10}$, $R^{11}$, $R^{12}$, $R^{13}$ and $R^{14}$ is a saturated hydrocarbon moiety.

6. The copolymer of claim 4, wherein at least one of $R^7$, $R^8$, $R^9$, $R^{10}$, $R^{11}$, $R^{12}$, $R^{13}$ and $R^{14}$ is an unsaturated hydrocarbon moiety.

7. The copolymer of claim 4, wherein at least one of $R^7$, $R^8$, $R^9$, $R^{10}$, $R^{11}$, $R^{12}$, $R^{13}$ and $R^{14}$ is a fluorinated hydrocarbon moiety.

8. The copolymer of claim 4, wherein both E and A represent oxygen.

9. The copolymer of claim 4, wherein said carborane-(siloxane or silane)-unsaturated hydrocarbon polymer component has the formula:

where:
(1) n is an integer from 1 to 12 and u and y are positive integers;
(2) $-(C{\equiv}C)_n-$ represents an acetylenic moiety;
(3) $R^7$, $R^8$, $R^9$ and $R^{10}$ represent hydrocarbon moieties or halosubstituted hydrocarbon moieties;

(4)

represents said carboranyl group; and
(5) q and q' are integers from 3 to 16; and
(6) x represents an integer greater than or equal to zero.

10. The copolymer of claim 9, wherein said aromatic acetylenic component is an aromatic acetylenic monomer having the formula:

where $R^1$ is $-C{\equiv}C\phi$, and where $R^2$, $R^3$, $R^4$, $R^5$ and $R^6$ are independently selected from the group consisting of unsubstituted alkyl, substituted alkyl, unsubstituted alkenyl, substituted alkenyl, unsubstituted alkynyl, substituted alkynyl, substituted aryl, and unsubstituted aryl functional groups, $-H$, and $R^1$, at least one of $R^2$ through $R^6$ being $R^1$;

a mixture of aromatic acetylenic monomer having said formula I; a prepolymer made by oligomerizing an aromatic acetylenic monomer having said formula I to an oligomeric mixture; a prepolymer made by oligomerizing a mixture of aromatic acetylenic monomers having said formula I to an oligomeric mixture; or a mixture thereof.

11. The copolymer of claim 10, wherein said aromatic acetylenic component is an aromatic acetylene having the formula II:

wherein $R^1$ is $-C{\equiv}C\phi$, and $R^2$, $R^3$, and $R^4$ are independently selected from the group consisting of unsubstituted alkyl, substituted alkyl, unsubstituted alkenyl, substituted alkenyl, unsubstituted alkynyl, substituted alkynyl, substituted aryl, and unsubstituted aryl functional groups, $-C{\equiv}C\phi$, and $-H$;

or a mixture of aromatic acetylenic monomer having said formula II; a prepolymer made by oligomerizing an aromatic acetylenic monomer having said formula II to an oligomeric mixture; a prepolymer made by oligomerizing a mixture of aromatic acetylenic monomers having said formula II to an oligomeric mixture; or a mixture thereof.

12. The copolymer of claim 11, wherein said aromatic acetylenic component is an aromatic acetylene monomer selected from the group consisting of:

or a mixture of said aromatic acetylenic monomers, a prepolymer made by oligomerizing one of said selected aromatic acetylenic monomers to an oligomeric mixture, a prepolymer made by oligomerizing a mixture of said aromatic acetylenic prepolymers to an oligomeric mixture, or a mixture thereof.

13. The copolymer of claim 1, wherein the weight ratio of said aromatic acetylenic component to said carborane-(siloxane or silane)-unsaturated hydrocarbon polymer component is from about 5:95 to about 95:5.

14. The copolymer of claim 13, wherein the weight ratio of said aromatic acetylenic component to said carborane-(siloxane or silane)-unsaturated hydrocarbon polymer component is from about 50:50 to about 65:35.

15. The copolymer of claim 1, wherein said aromatic acetylenic component comprises one or more of the following prepolymers:

or where a is an integer having a value $\geq 1$, b is an integer having a value $\geq 1$ and c is an integer having a value $\geq 1$.

16. The copolymer of claim 4, wherein said aromatic acetylenic component comprises one or more of the following prepolymers:

where a is an integer having a value $\geq 1$, b is an integer having a value $\geq 1$ and c is an integer having a value $\geq 1$.

17. The copolymer of claim 9, wherein said aromatic acetylenic component comprises one or more of the following prepolymers:

where a is an integer having a a value $\geq 1$, b is an integer having a value $\geq 1$ and c is an integer having a value $\geq 1$.

18. A carbon-ceramic composition produced by pyrolyzing the copolymer of claim 1 under a non-reactive or oxidizing atmosphere.

19. The carbon-ceramic composition of claim 18, wherein said copolymer was pyrolyzed at from about 500° C. to about 1100° C.

20. A carbon-ceramic composition produced by pyrolyzing the copolymer of claim 14 and aging said pyrolyzed copolymer at from about 400° C. to about 1200 C. in air or oxygen.

* * * * *